(12) United States Patent
Lindqvist et al.

(10) Patent No.: US 8,204,506 B2
(45) Date of Patent: *Jun. 19, 2012

(54) METHOD AND APPARATUSES FOR ALLOCATING SERVICE AREA IDENTIFIERS IN A WIRELESS SYSTEM

(75) Inventors: Thomas Lindqvist, Mölndal (SE);
Tomas Nylander, Varmdö (SE); Jari Vikberg, Järna (SE)

(73) Assignee: Telefonaktiebolaget L M Ericsson (publ) (SE)

( * ) Notice: Subject to any disclaimer, the term of this patent is extended or adjusted under 35 U.S.C. 154(b) by 246 days.

This patent is subject to a terminal disclaimer.

(21) Appl. No.: 12/530,106

(22) PCT Filed: Feb. 1, 2008

(86) PCT No.: PCT/SE2008/050131
§ 371 (c)(1),
(2), (4) Date: Mar. 23, 2010

(87) PCT Pub. No.: WO2008/108716
PCT Pub. Date: Sep. 12, 2008

(65) Prior Publication Data
US 2010/0184421 A1 Jul. 22, 2010

Related U.S. Application Data

(60) Provisional application No. 60/893,765, filed on Mar. 8, 2007.

(51) Int. Cl.
*H04W 72/00* (2009.01)

(52) U.S. Cl. ...... 455/450; 455/11.1; 455/13.1; 455/406; 455/423; 455/434; 455/440; 455/442; 455/444; 455/453; 370/310.2; 370/315; 370/328; 370/338

(58) Field of Classification Search .......... 455/423–424, 455/434, 446–449, 450, 453, 11.1, 13.1, 455/406, 437; 370/310.2, 315, 328, 338
See application file for complete search history.

(56) References Cited

U.S. PATENT DOCUMENTS
5,434,798 A * 7/1995 Madebrink et al. ........... 709/221
(Continued)

FOREIGN PATENT DOCUMENTS
| GB | 2 369 002 A | 5/2002 |
| WO | WO 01/41494 A1 | 6/2001 |
| WO | WO 01/52569 A1 | 7/2001 |

(Continued)

OTHER PUBLICATIONS
International Search Report dated Jul. 22, 2008 (5 pages).

*Primary Examiner* — Steve D Agosta
(74) *Attorney, Agent, or Firm* — Myers Bigel Sibley & Sajovec, P.A.

(57) ABSTRACT

The present invention relates to a method for allocating service area identifiers (SAI) for a femto cell (200A) upon the femto cell (200A) being created. According to the method, information is received about detected cells obtained by scanning performed by a femto radio base station (210A) that is serving the femto cell (200A) in addition to information identifying the femto base station (210A) or the femto cell (200A); a request for SAIs, is transmitted to a SAI selection entity (250, 400) based on the received information, and SAIs selected by a selection entity (250) are received together with an associated user type. The identifiers are further allocated for the created femto cell (200A). The present invention also relates to an apparatus (100, 300) and to the selection entity (250, 400).

18 Claims, 6 Drawing Sheets

U.S. PATENT DOCUMENTS

| | | | |
|---|---|---|---|
| 5,475,870 A * | 12/1995 | Weaver et al. | 455/67.11 |
| 6,041,228 A * | 3/2000 | Niska et al. | 455/419 |
| 6,944,426 B1 * | 9/2005 | Esser et al. | 455/62 |
| 7,477,920 B2 * | 1/2009 | Scheinert et al. | 455/561 |
| 2007/0097939 A1 | 5/2007 | Nylander et al. | |
| 2007/0105527 A1 | 5/2007 | Nylander et al. | |

FOREIGN PATENT DOCUMENTS

| | | |
|---|---|---|
| WO | WO 2005/086421 A1 | 9/2005 |
| WO | WO 2007/040449 A1 | 4/2007 |
| WO | WO 2007/117184 A1 | 10/2007 |
| WO | WO 2007/136339 A2 | 11/2007 |

* cited by examiner

METHOD AND APPARATUSES FOR ALLOCATING SERVICE AREA IDENTIFIERS IN A WIRELESS SYSTEM

TECHNICAL FIELD

The present invention relates generally to the field of wireless or mobile communications network systems, and, more specifically, to a method and apparatuses for allocating service area identifiers for a femto cell in a wireless communications system.

BACKGROUND

Wireless access networks have become a key element of a variety of telecommunications network environments. As to enterprise network environments, they provide convenient wireless access to network resources for employees or customers carrying laptops and/or mobile handheld devices. In addition, wireless access points operable with diverse communication devices, such as laptops, mobile phones, etc., are broadly used in public environment such as e.g., hotels, train stations, airports, restaurants, schools, universities and homes, and are mostly used to offer high-speed internet access.

The telecommunication industries and operators are currently investigating the possibility to further increase the coverage area offered by cellular communications network systems to home or small areas. Examples of cellular communication network system are: the Universal Mobile Telecommunication Systems (UMTS) network, also known as third generation (3G) cellular network system or wideband code division multiplexing access (WCDMA) network; the Global System for Mobile telecommunications (GSM) network; the General Packet Radio Service (GPRS) network that utilizes the infrastructure of a GSM system; Two further examples of cellular access networks are EDGE and EGPRS which are further enhancements to GSM and GPRS. EDGE refers to enhanced Data rates for GSM Evolution, and EGPRS refers to Enhanced GPRS.

According to such investigation, a limited number of users (e.g. a user equipment (UE)) may be provided with e.g. WCDMA or 3G coverage using a small radio base stations (RBS) also called a "femto RBS" that would be connected to a radio network controller (RNC) of the 3G network using some kind of Internet protocol (IP) based transmission. The coverage area so provided is called a "femto cell" to indicate that the coverage area is relatively small compared with an area of a macro cell of a public land mobile network (PLMN). Other terminology for a femto RBS includes a "Home RBS" and/or a "home 3G access point (H3GAP)" and/or a "home access point (HAP)" and/or a "home Node B (HNB)" and/or a home E-UTRAN Node B (HeNB). It should be mentioned that small cells known as picocells may serve small areas such as part of a building, a street corner or a airplane cabin and are usually smaller than microcells, which in turn is smaller than a macrocell. The picocells are traditionally provided as coverage or capacity extensions and do not include an access control mechanism. This means that all users that are allowed to access macrocells of a PLMN are also allowed to access microcells and picocells of the same PLMN.

One alternative for the IP based transmission is to use fixed broadband access (like xDSL, Cable, etc.) to connect the femto RBS to the RNC. Another alternative would be to use mobile broadband access e.g. some WiMAX technologies or HSDPA and enhanced uplink also known as HSPA.

FIG. 1 illustrates an example of a WCDMA network 1 built with a traditional architecture including one or several RNCs 20 and femto RBSs 40 working as H3GAP. However the RBS's and RNC's may as well be collapsed and form a single node in a so called flat architecture. As shown in FIG. 1, the network 1 comprises a core network (CN) 80 connected to a RNC 20 that controls all radio base stations connected to it, i.e. macro RBS 30 and femto RBSs 40. The macro RBS 30 serves a macro cell 31 whereas a femto RBS 40 serves a femto cell 41. As illustrated, each femto RBS 40 serves its dedicated femto cell 41. As well known in the art, a RBS is typically situated at an interior (e.g. centre) of the respective cell which the RBS serves, but for the sake of clarity, the macro RBS 30 and the femto RBSs 40 of FIG. 1 are shown instead as being associated by double headed arrows to their respective cells. At least some of the femto cells 41 are geographically overlayed or overlapped by the macro cell 31.

A user equipment (UE) 50 communicates with one or more cells or one or more RBSs over a radio interface. The UE 50 can be a mobile phone (or "cellular phone"), a laptop with mobile termination and thus can be e.g. portable, pocket, handheld, computer-included, or car-mounted mobile device which can communicate voice and/or data with a radio access network. The UE 50 may further communicate with the radio access network via a femto RBS 40 through an internet protocol (IP) based transmission network 60 which, as described earlier, can be either broadband fixed IP based transmission (e.g. xDSL) or broadband mobile IP based transmission (e.g. WiMAX or HSPA) or any other suitable IP based transmission.

In the wireless communications network system depicted in FIG. 1, the interface between the each femto RBS 40 and the RNC 20 can be called the extended Iub interface "Iub+" which is usually formed by an IP connection over the IP based transmission network 60. In some implementations, the Iub+ resembles the Iub interface between the macro RBS 30 and the RNC 20, but the Iub+ interface is modified for conveying additional information such as the identity of the femto RBS 40 e.g. during the initial power-on procedure of the femto RBS 40. It should be mentioned that the Iub interface is not necessarily IP based.

Also illustrated in FIG. 1, is the Iu interface used between the RNC 20 and the CN 80. Note that in a flat architecture there would not necessarily exist any Iub(+) interface because, as described above, in such flat architecture the RBS and the RNC can form a single node. In order to limit the users of UEs 50 of the femto cell 41 to the ones that are allowed, an access control feature can be implemented in the system. This way, at any UE attempt to camp on the femto cell, it is checked if the user is an allowed user. The international subscriber mobile identity (IMSI) of allowed users (or UEs) per femto RBS are stored in a database 70, known as an access control database (ACDB), to which the stand-alone or integrated RNC has access. This approach is described in the international patent application with publication number WO 2007/136339.

In prior art WCDMA networks that are based on macro/micro/pico cells of a PLMN i.e. WCDMA networks that do not include femto cells, a service area identifier (SAI) is used to identify an area consisting of one or more cells belonging to the same location area (LA). Such an area is called a service area and can be used for indicating the location of a UE to the core network (CN). A SAI of a current cell is indicated by the RNC to the CN when a signalling connection is established for a UE. The CN can use the SAI for the purposes of routing and charging as well as different location based services i.e. services that are based on the current location of the UE. Examples of such services:

Emergency call routing (e.g. to route a call to the correct emergency center)

Location calling services (e.g. to route a call to e.g. the closest taxi)

Legal intercept (to find out UE location on service area basis).

Charging indication (e.g. as charging areas).

The CN can also be informed about SAI changes for a UE using standard mechanisms in the Iu-interface and in a so called RANAP (Radio Access Network Application Part) protocol signalling over the Iu-interface. In the 3GPP standard (Third Generation Partnership Project), the SAI is defined as consisting of a service area code (SAC) together with the PLMN-id (consisting of a mobile country code (MCC), a mobile network code (MNC)) and the location area code (LAC)). The SAI can be defined according to the following:

SAI=PLMN-id||LAC||SAC

The LAI is also defined as consisting of PLMN-id and LAC and therefore SAI can be also defined as follows:

SAI=LAI||SAC

The SAC is usually defined by the operator of the network and is normally configured in the RNC via O&M (operation and maintenance). The SAI is further set for a macro/micro/pico cell depending on the location of the macro/micro/pico cell. The SAI values are further coordinated between the radio access network and the CN so that e.g. the relevant location based services in the CN can be configured with this information. The RNC includes separately both the LAI and SAI for the current macro/micro/pico cell towards the CN. The LAI is used by the CN for e.g. mobility management (MM purposes) and the SAI can be used for e.g. location based services as previously described.

As described above, a SAI of a macro/micro/pico cell in the network is indicated by the RNC to the CN when a signalling connection is established for a UE. If femto cells are introduced in the network, a separate SAI for each such femto cell needs to be indicated by the RNC and mapped to, for example, a location information in the CN. With manual (or semi-manual) configuration, a femto cell could be given one or more SAI(s) and a mapping of these SAIs to a location information in the CN could be performed in a similar way as for the pico, micro and macro cells. However manual (or semi-manual) configuration both in the RNC and in the CN, of a huge number of femto cells e.g. hundred of thousands or even millions of femto cells is not considered a feasible solution especially since SAIs are not broadcasted in the network in addition to that femto cells can be created anywhere in the network by end users in a plug and play manner without operator intervention and can also change location since a femto RBS can easily be moved by end users. In the scenario with the huge number of femto cells described above, the RNC further needs to indicate all the SAIs to the CN which leads to excessive configuration load in the CN because the CN would be involved in all location based services. Furthermore, other services such as differentiated charging cannot be indicated using the above mentioned manually configured single SAI per femto cell. In other words, automatic configuration for the huge number of femto cells is required in order to support other services such as location based services and differentiated charging.

SUMMARY

An object of the present invention is thus to obviate at least some of the above disadvantages by providing a method and apparatuses for dynamically and automatically allocating, upon a femto cell being created, at least one SAI for the femto cell, without increasing the manual configuration need in the core network, and still permitting the allocated SAI(s) to support both location based services and differentiated charging for users in the femto cell.

According to a first aspect of the present invention, the above stated problem is solved by means of a method for allocating at least one SAI for a femto cell that is served by a femto RBS, upon the femto cell being created. The method comprises: receiving information about detected cells obtained by scanning performed by the femto RBS and information identifying the femto RBS and/or the femto cell; transmitting a request for at least one SAI for the femto cell, to a femto SAI selection entity, the request being based on the received information; receiving at least one SAI and an associated user type, selected by the femto SAI selection entity and allocating the selected SAI and the associated user type, for the created femto cell.

According to a second aspect of the present invention, the above stated problem is solved by means of an apparatus for allocating at least one SAI for a femto cell that is served by a femto RBS, upon the femto cell being created. The apparatus comprises: receiver means configured to receive information about detected cells obtained by scanning performed by the femto RBS and information identifying the femto cell and/or the femto RBS; transmitting means configured to transmit to a femto SAI selection entity, a request for at least one SAI for the femto cell, the request being based on the received information, receiver means for receiving at least one SAI and an associated user type selected by the femto SAI selection entity and means for allocating the selected SAI and the associated user type, for the created femto cell.

According to a third aspect of the present invention, the above stated problem is solved by means of a selection entity that is configured to select at least one SAI for a femto cell that is served by a femto RBS, upon the cell being created. The entity comprises: receiver means configured to receive a request for at least one SAI for the femto cell, the request being based on information identifying the femto cell and/or a femto RBS serving the femto cell and information about detected cells obtained by scanning performed by the femto RBS; selecting means configured to select at least one SAI and an associated user type for the femto cell and transmitting means configured to transmit at least one selected SAI and the associated user type and information identifying the femto cell and/or the femto RBS.

An advantage with the present invention is that the SAI(s) that are allocated for a femto cell in the network can be dynamically and automatically selected when the femto cell is created and can also indicate both location and charging information towards the core network of the network. This also reduces the manual configuration need in the core network.

The present invention will now be described in more details by means of several embodiments and with reference to the accompanying drawings, attention to be called to the fact, however, that the following drawings are illustrative only, and that various modifications and changes may be made in the specific embodiments illustrated as described within the scope of the appended claims.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

Figure 1:
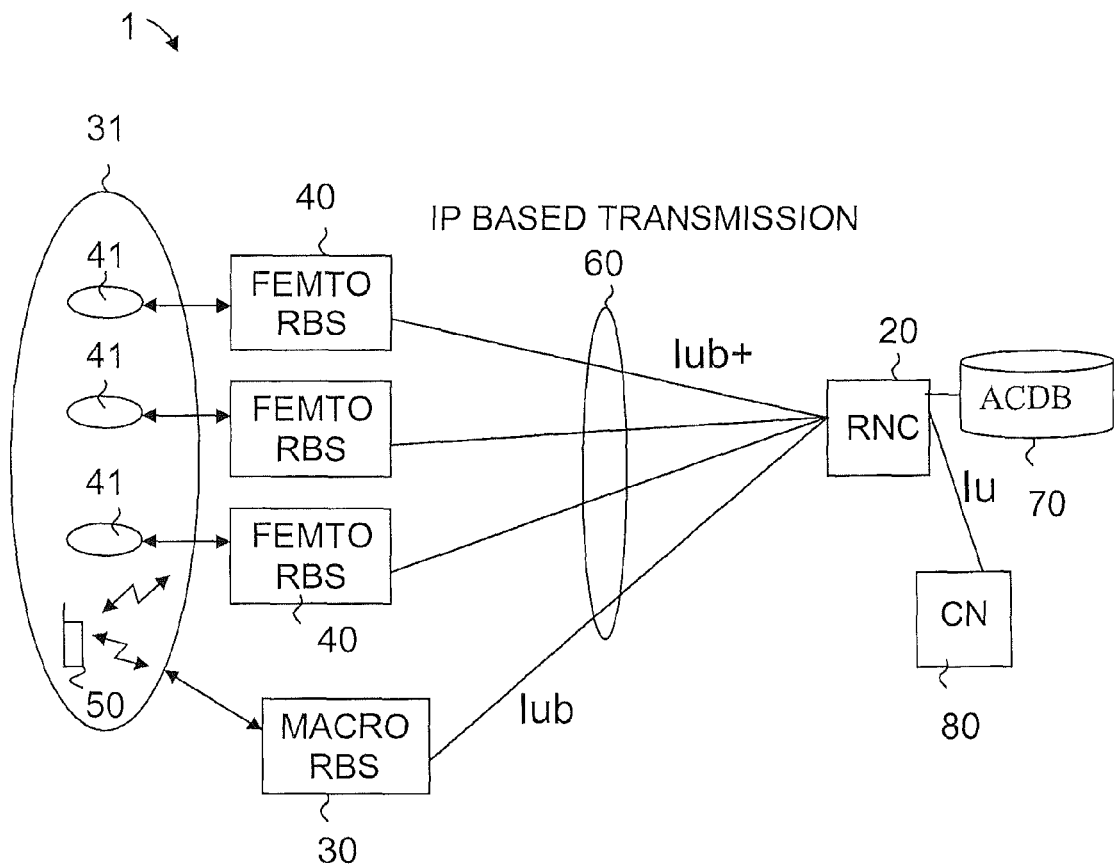
FIG. 1 is a block diagram illustrating an exemplary WCDMA wireless communications network including femto radio base stations in which the present invention may be used.

The present invention is described herein by way of reference to particular example scenarios. In particular the invention is described in a non-limiting general context in relation to a WCDMA wireless communications network including femto radio base stations that are connected to a radio network control node i.e. a radio network controller (RNC) of the WCDMA wireless network via a fixed IP based broadband access network in a traditional architecture as shown in FIG. 1. It should be noted that the present invention and it exemplary embodiments may also be applied to other types of radio technologies and architectures such as flat architecture for WCDMA, GSM, LTE (long term evolution), WiMAX etc.

Figure 2:
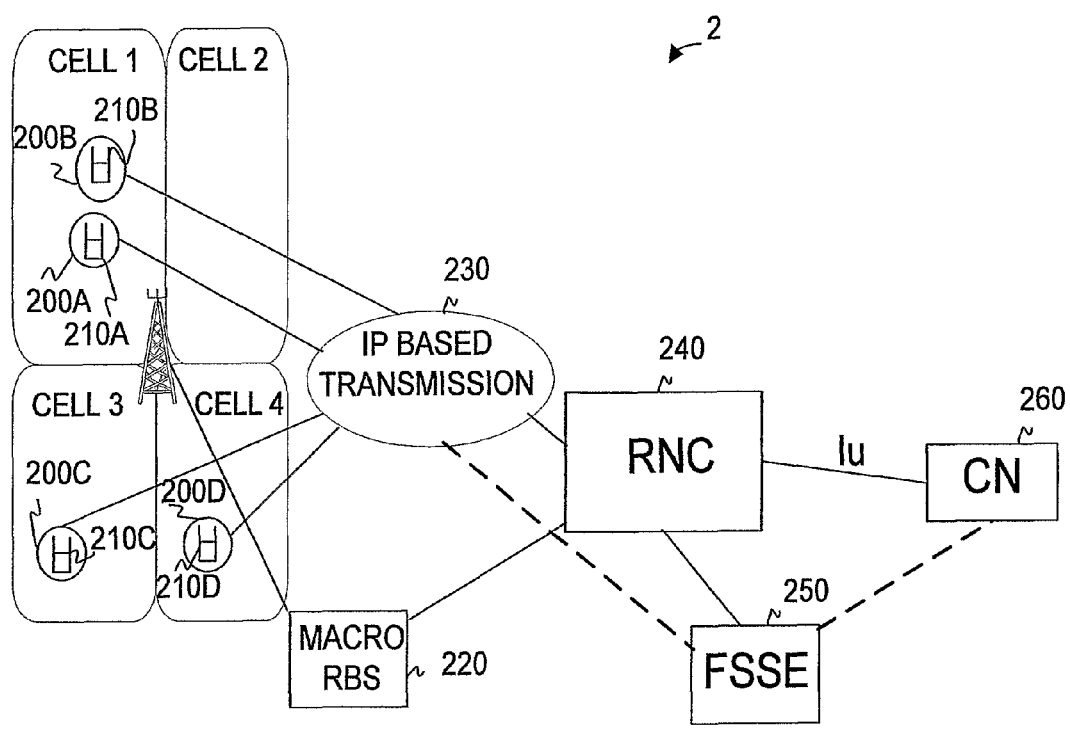
FIG. 2 is another block diagram illustrating an exemplary wireless communications network including macro cells and femto cells in which the present invention may be used.

In FIG. 2 there is illustrated the relation between femto cells e.g. 200A-200D and macro cells CELL 1-CELL 4 in an exemplary wireless communications system 2. The main difference between the location of macro cells and the location of femto cells in a network is that the location of macro cells CELL 1-CELL 4 is known and planned by the operator of the network whereas the femto cells 200A-200D can be dynamically installed in any place by the end users or the owners of the femto RBSs 210A-210D, usually without any operator intervention. Note that the wireless system 2 is not restricted to any specific number of macro cells, femto cells and femto RBSs. In addition, although FIG. 2 shows only a single macro RBS 220 that controls four different cells it is clear that any number of macro RBSs maybe included in the wireless system 2. As an example, each macro cell can be controlled by it own macro RBS. The scenario depicted in FIG. 2 is therefore considered as an example of a wireless network in which the different exemplary embodiments of the present invention may be used. FIG. 2 also depicts an apparatus 240 which in this exemplary scenario represents a radio network control node (RNC) 240. The RNC 240 is further connected to a core network (CN) 260 and to a femto SAI selection entity FSSE 250. The femto RBSs 210A-210D can thus communicate with the RNC 240 and/or the FSSE 250 via the IP based transmission network 230 which as mentioned before can represent either broadband fixed IP based transmission (e.g. xDSL) or broadband mobile IP based transmission (e.g. WiMAX, HSPA) or any other suitable IP based transmission.

In the following, it is described in conjunction with exemplary embodiments of the present invention, how at least one SAI is/are allocated for a femto cell e.g. 200A that is served by a femto RBS e.g. 210A, upon the femto cell 200A being created. When the femto RBS 210A is powered up and the femto cell 200A is to be created, the built-in wireless receiver of the femto RBS 210A starts performing a scanning of the environment e.g. frequencies, scrambling codes, cell identities, system information and measurement information for each identified cell (i.e. characteristics of macro and femto cells) etc. The system information, which is broadcasted in the environment, includes one or more cell identifiers (Cell-IDs), one or several location area identifier (LAIs) and one or several routing area codes (RAC). The system information usually relates to the macro cells in the environment. Each LAI in the system information identifies the node that is controlling the detected macro cell. Such node can e.g. be a mobile switching centre (MSC) in the CN 260. The LAI together with the RAC builds up the routing area identity (RAI) which can be used to identify, for example, the SGSN (serving GPRS support node), in the CN 260, that is controlling the macro cell.

Referring back to FIG. 2, as the femto RBS 210A obtains information about detected cells in the network 2, the femto RBS 210A connects to the RNC 240. The femto RBS 210A reports to the RNC 240 the scanned information in addition to an information identifying the femto RBS 210A or/and an information identifying the femto cell 200A. In this exemplary scenario, the femto RBS 210A may for example have detected CELL 1, CELL 2, and femto cell 200B. According to an embodiment of the present invention, the information received by the RNC 240 is filtered so that all information about detected femto cells can be removed. The RNC 240 can, for example, use the received cell identities or scrambling codes to perform the filtering. As an example, in some cases specific scrambling codes are reserved and allocated for the femto cells and in some other cases, the RNC 240 is aware of which cell identities are used for femto cells. The present invention is therefore not restricted to any particular filtering approach. In the example described above, the RNC 240 thus filters out information identifying femto cell 200B. The RNC 240 then transmits a request for at least one SAI to the FSSE 250. In the request, information identifying macro cells CELL 1, CELL 2 detected by femto RBS 210B, is included. In the request to the FSSE 250, the RNC 240 further includes the information identifying femto RBS 210A and/or femto cell 200A so that the FSSE 250 can associate its response to the intended femto RBS/femto cell. Information identifying a femto RBS may for example comprise a hardware identity (FRBS-ID) which is unique to the femto RBS. The information identifying the femto cell may for example comprise a femto cell identity (FCELL-ID) which is also considered unique to the femto cell.

According to embodiments of the present invention, as the FSSE 250 receives the request from the RNC 240, it selects at least one SAI for the created femto cell 200A. According to an exemplary embodiment of the present invention, the service area identifiers can be pre-configured in the FSSE 250. As an example, the FSSE 250 may have previous knowledge about the SAIs used in the wireless network and also may have knowledge about which CN nodes (e.g. MSC, SGSN etc.) a specific RNC is connected to. The FSSE 250 may further be pre-configured with needed number of charging tariffs for each femto cell and the different user types. A user type may e.g. indicate if a user is a home user or a visiting user or a roaming user or any other user type. The FSSE 250 may further create new SAIs. A home user refers in this context to a subscriber/owner of a femto RBS while a visiting user is here considered to be a user that is allowed by the femto RBS subscriber/owner to use the femto RBS and is a subscriber in the operator's network. A roaming user is considered to be a user that is allowed by the femto RBS subscriber/owner to use the femto RBS but is not a subscriber in the operator's network. It should be noted that the present invention is not restricted to the above described user types.

According to embodiments of the previously, the FSSE 250 uses the information received from the RNC 240 i.e. information identifying CELL 1 and CELL 2 and pre-configured information to select the relevant SAIs for the created cell. According to an embodiment of the present invention, a selected SAI is indicative of location information and charging information. The charging information comprises charging tariffs where each tariff is associated with a type of user in the created femto cell 200A. The location information, on the other hand, is based on the information about detected cells which in this example are cells CELL 1 and CELL 2. As an example, for CELL 1, the information comprises the cell identity i.e. CELL 1, the location are identity related to CELL 1 e.g. LAI 1 and the routing area code related to CELL 1 e.g. RAC 1. For CELL 2, the information comprises CELL 2, LA 2 and RAC 2. Note that this information is retrieved from the broadcasted system information received by the femto RBS 210 during the scanning of the environment. It should be noted that CELL 1 and CELL 2 may belong to the same location area (i.e. LA1=LA2)

According to an exemplary embodiment of the present invention, in case the location information is indicative of the wireless network 2 that comprises detected cells CELL 1 and CELL 2, then for each location area in the network 2 i.e. for LA 1 and LA 2 the FSSE 250 selects as many SAIs as the number of charging tariffs. If for example the charging tariffs correspond to a charging tariff for a home user, a charging tariff for a visiting user and a charging tariff for a roaming user, then the FSSE 250 selects 3 SAIs for LA 1 and 3 SAIs for LA 2. This means that all femto cells installed and created in LA 1, can share the selected 3 SAIs. Note that the number of charging tariffs can take any value.

For differentiating the charging between the different location areas, each charging tariff can be identified using as many SAIs as there are location areas in the network.

As an example, we can use the LAI part of the SAI (recall that the SAI is defined as SAI=LAI∥SAC) to indicate e.g. the macro network LA and then use 3 different SAC values for the different charging tariffs. This means that, in this exemplary embodiment, the same SAC value could be used for each femto charging tariff e.g. SAC value 10234 can be defined to indicate the charging tariff corresponding to a home user, and only the LAI part of the SAI can change to indicate the location of the created femto cell. This allows for easier configuration in the network. According to the above described exemplary embodiment of the present invention, FSSE 250 thus can select for LA 1 the following SAIs: $SAI_{H1}$, $SAI_{V1}$, $SAI_{R1}$, so that all created femto cells in LA 1 can share the selected SAIs. $SAI_{H1}$ indicates a SAI for a home user type; $SAI_{V1}$ indicates a SAI for visiting user type and $SAI_{R1}$ indicates a SAI for roaming user type. Note that the exemplary embodiments of the present invention are not restricted to a single home user, a single visiting user or a single roaming user in a femto cell.

According to another exemplary embodiment of the present invention, in case the location information is indicative of one of the macro cells of the network i.e CELL 1 or CELL 2, then for each cell, 3 SAIs can be selected by FSSE 250. This means that all femto cells installed and created in CELL 1, can share the selected 3 SAIs. Note that the number of charging tariffs can take any value. Thus, for differentiating the charging between the macro cells, each charging tariff can be identified using as many SAIs as there are macro cells in the network.

Referring back to FIG. 2, when the FSSE 250 selects the relevant SAIs and an associated user type for each SAI, it returns these to the RNC 240 together with information identifying the created femto cell 200A or the femto RBS 210A. The RNC 240 then allocates the SAIs and the associated user type, for the created femto cell 200A. According to exemplary embodiments of the present invention, the RNC 240 is also configured to store the received SAIs in a cell configuration context for the created femto cell 200A, in order to be able to provide location based services and differentiated charging to user equipments accessing the created femto cell. The differentiated charging is based on the user type of the user equipment i.e. if the user type is a home user, a visiting user or a roaming user or any other type.

It should be noted that the FSSE 250 may further be configured to automatically configure the CN 260 with the selected SAIs for the created femto cell. This is indicated by the dashed line between FSSE 250 and CN 260 in FIG. 2. Thus, the CN 260 may be configured with both SAIs for macro cells and SAIs for femto cells.

Figure 3:
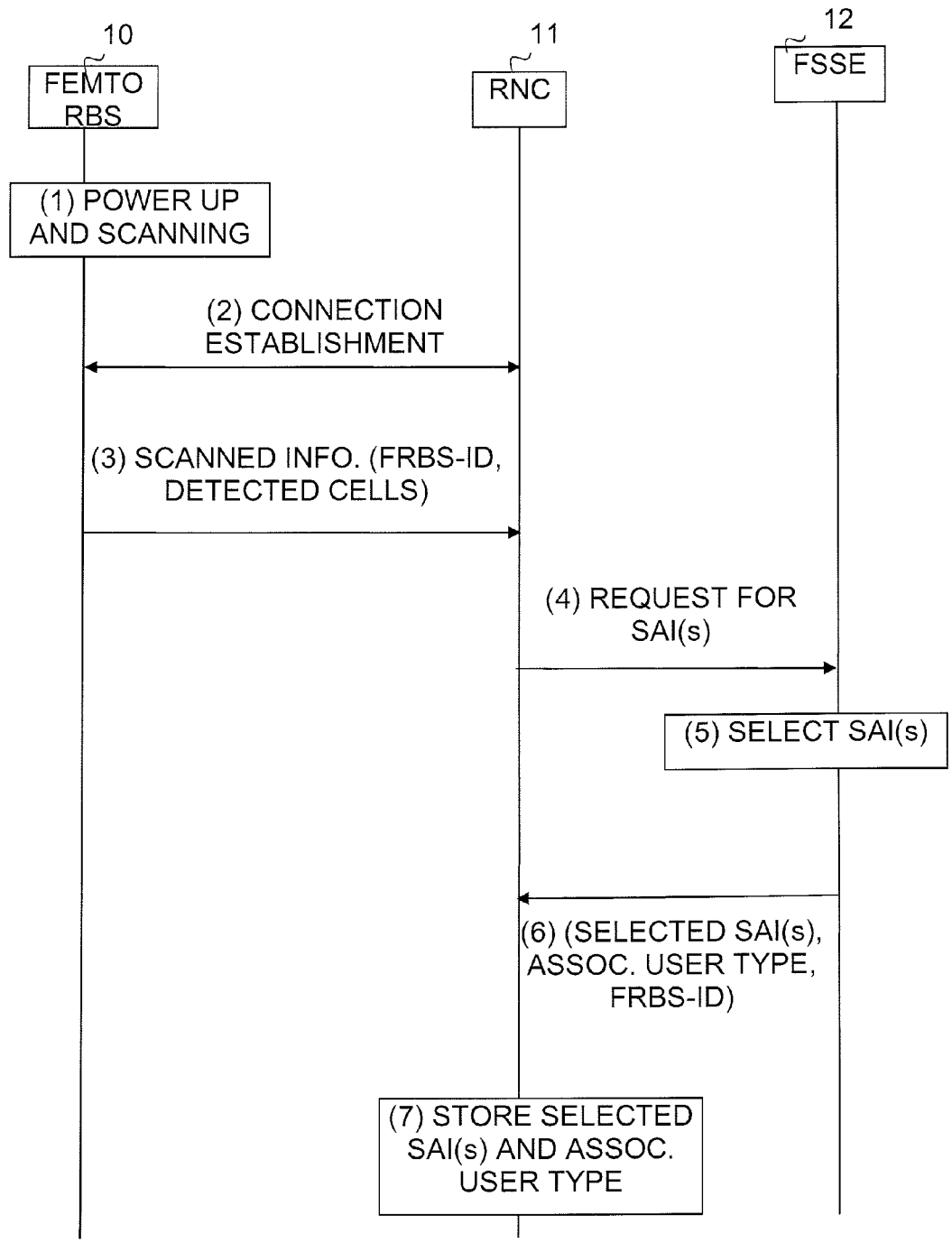
FIG. 3 illustrates a signalling diagram illustrating the flow of messages in an exemplary embodiment of the present invention.

Referring to FIG. 3 there is illustrated a signalling diagram illustrating the flow of messages summarizing the method of allocating at least one SAI for a femto cell, as described earlier in conjunction with FIG. 2.

In (1) the femto RBS 10 is powered up and the femto cell served by the femto RBS 10 is thus about to be created. A scanning of the surrounding coverage is then performed to find out e.g. frequencies, scrambling codes, cell identities of both macro cells in the network and femto cells, system information, measurement information for each identified cell (i.e. characteristics of macro and femto cells) etc. When the scanning is done, the femto RBS 10 in (2) connects to the RNC 11. The femto RBS 10 reports in (3) information retrieved from the scanning performed in (1). Such information comprises detected cells. In (3), the femto RBS 10 also reports to the RNC 11 information identifying the femto RBS 10 i.e. FRBS-ID. The RNC 11 may then remove information identifying other femto cells that may have been reported by the femto RBS 10 i.e. the RNC 11 may perform a filtering. The RNC 11 transmits in (4) a request for at least on SAI to the FSSE 12. Information about detected macro cells is included in the request in addition to the FRBS-ID of the currently created femto cell. The FSSE 12 in (5) uses the information received and previously configured information, as described earlier, and selects the relevant SAI(s) for the femto cell and an associated user type. Note that this step might also mean that new SAI(s) can be created and in this case the CN (not shown) can also be automatically configured with the selected SAI(s). In (6) the selected SAI(s) and an associated user type for each SAI are returned to the RNC 11 together with information identifying the femto RBS 10 i.e. FRBS-ID. In (7) The RNC 11 subsequently stores the received SAI(s) and the associated user type, in a femto cell configuration context for the created femto cell. The SAI(s) can be used later when one or several user equipments is/are accessing the femto cell. Which of the SAIs that is used for a user depends, as described before, on which charging tariff that is associated with the user accessing the femto cell i.e. if the user is a home user, a visiting user or a roaming user etc. Although described in terms of an embodiment in a WCDMA network built with a traditional architecture, the invention and its different exemplary embodiments may also be applied to other types of radio technologies and architectures such as WCDMA flat architecture, LTE, GSM, WiMAX networks etc. It should also be contemplated that instead of a RNC, an apparatus can be configured to include the functionalities of the RNC and/or the femto RBS (e.g. in the LTE case and/or in the case of a WCDMA flat architecture). In case the apparatus comprises the femto RBS or is a femto RBS then it can perform the scanning and the sending of the scanned information directly to the FSSE. In addition, such apparatus is also configured to perform the filtering described above.

Figure 4A:
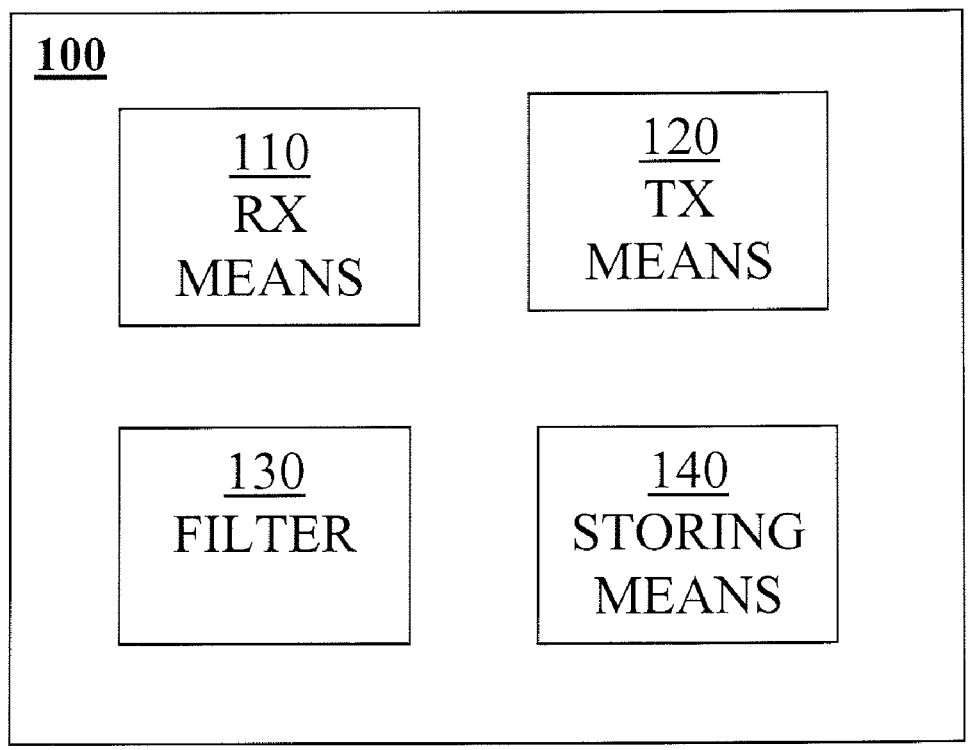
FIG. 4A illustrates an apparatus according to an exemplary embodiment of the present invention.

FIG. 4A illustrates an exemplary apparatus 100 for allocating at least one SAI for a femto cell, according to an exemplary embodiment of the present invention. As shown, apparatus 100, which in this exemplary embodiment of the present invention, comprises a radio network control node, includes receiver means 110 (RX MEANS) for receiving information about detected cells in the network and information identifying the femto cell/femto RBS. The apparatus 100 further comprises transmitting means 120 (TX MEANS) for transmitting a request for at least one SAI and an associated user type, for the created femto cell, to a FSSE. The receiver means 110 of apparatus 100 is further configured to receive the selected SAI(s) and associated user type and to allocate these for the created femto cell. Apparatus 100 further comprises filtering means 130 (FILTER) for filtering information identifying other femto cells that may be included in the scanned information. Apparatus 100 further comprises storing means 140 (STORING MEANS) configured to store the information received from the FSSE, in a configuration context for the created femto cell.

Figure 4B:
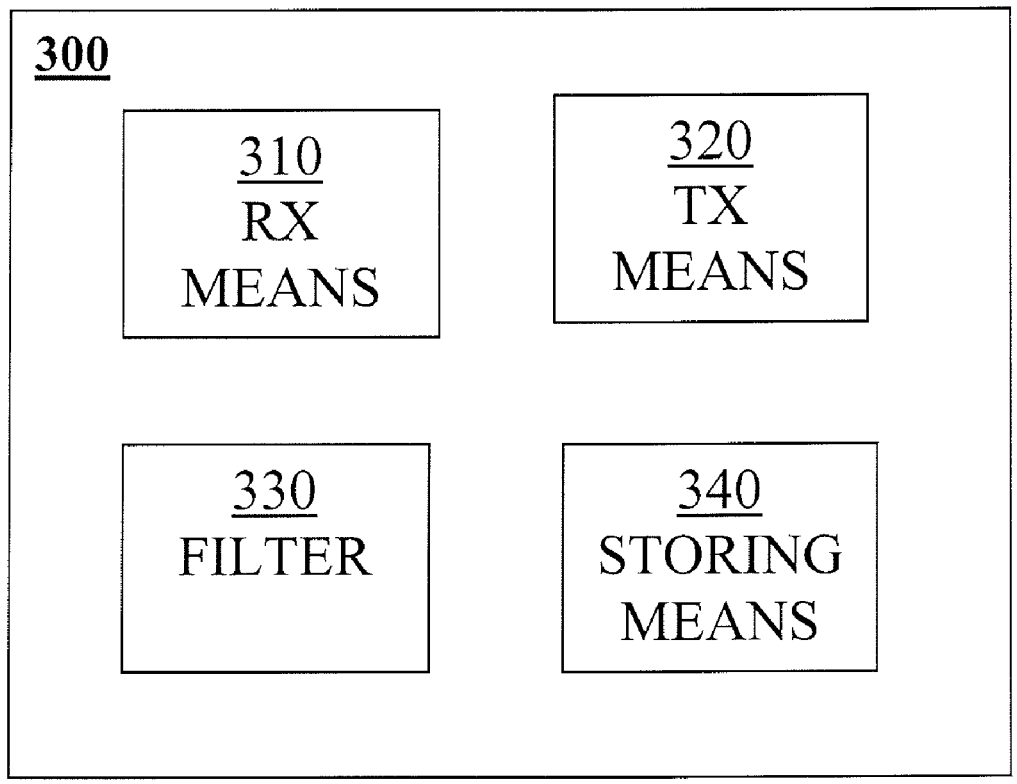
FIG. 4B illustrates an apparatus according to another exemplary embodiment of the present invention.

FIG. 4B illustrates another exemplary apparatus 300 for allocating at least one SAI for a femto cell, according to another exemplary embodiment of the present invention. In this exemplary embodiment, apparatus 300 comprises a femto RBS or a radio network control node and a femto RBS. As shown, apparatus 300 comprises receiver means 310 (RX MEANS) for performing the scanning in order to receive/ obtain information about detected cells scanned in the network and to retrieve information identifying the femto cell/ femto RBS. The apparatus 300 further comprises transmitting means 320 (TX MEANS) for transmitting a request for at least one SAI and an associated user type, for the created femto cell, to a FSSE. The receiver means 310 of apparatus 300 is further configured to receive the selected SAI(s) and associated user type and to allocate these for the created femto cell. Apparatus 300 further comprises filtering means 330 (FILTER) for filtering information identifying other femto cells that may be included in the scanned information. Apparatus 300 further comprises storing means 340 (STORING MEANS) configured to store the information received from the FSSE, in a configuration context for the created femto cell. Note that apparatuses 100 and 300 may comprise other elements not illustrated in FIGS. 4A and 4B respectively. Furthermore, the different blocks of apparatuses 100 and 300 are not necessarily separated but could be included in a single block.

Figure 5:
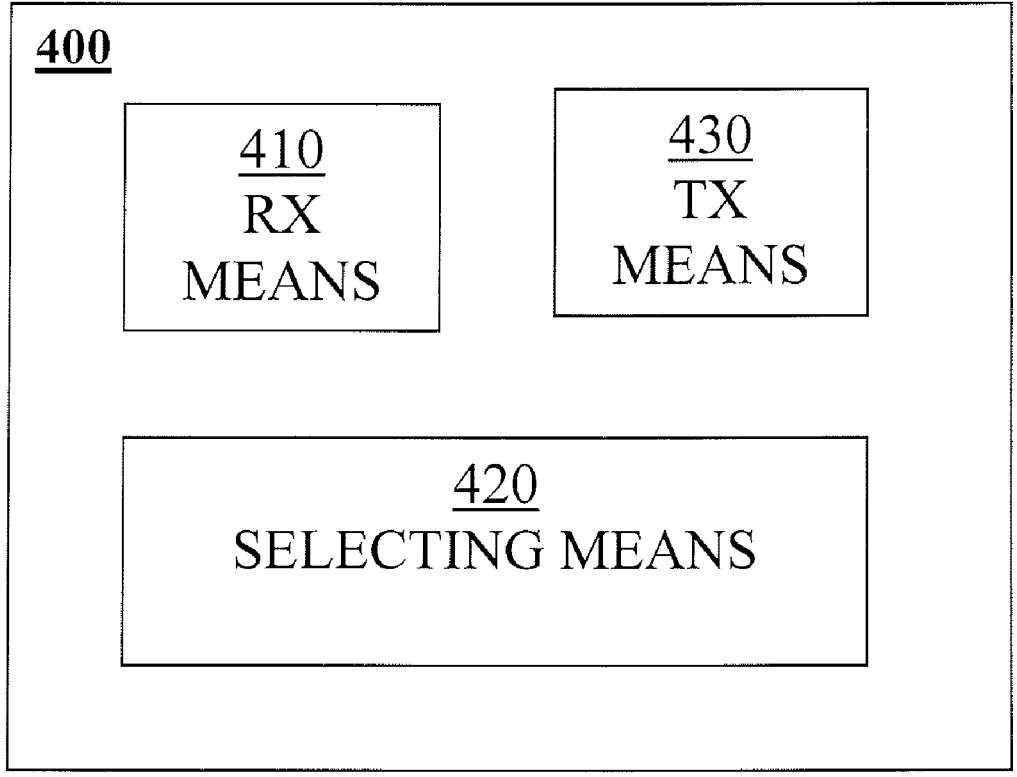
FIG. 5 illustrates a femto SAI selection entity according to an exemplary embodiment of the present invention.

FIG. 5 illustrates an exemplary femto SAI selection entity (FSSE) 400 in accordance with an exemplary embodiment of the present invention, for selecting at least one SAI for a femto cell that is served by a femto RBS, upon the femto cell being created. The FSSE 400 comprises receiver means (RX MEANS) 410 configured to receive a request for at least one SAI for the femto cell. The request is based on information identifying the femto cell and/or the femto RBS and information identifying detected cells obtained by scanning performed by the femto RBS. The FSSE 400 further comprises selecting means (SELECTING MEANS) 420 configured to select at least one SAI and an associated user type, for the created femto cell. The FSSE 400 further comprises transmitting means (TX MEANS) 430 for transmitting the selected SAI(s) and the associated user type, and also configured to transmit the information identifying the femto cell and/or the femto RBS. Note again that the FSSE 400 may comprise other elements not illustrated in FIG. 5. As an example, FSSE 400 may comprise configuration means for performing the configuration of the core network with the selected/needed SAIs as previously described. Note also that different blocks of FSSE 400 are not necessarily separated but could be included in a single block.

The present invention and its embodiments can be realised in many ways. For example, one embodiment of the present invention includes a computer-readable medium having instructions stored thereon that are executable by a computer system located in one or several network nodes (apparatuses, FSSE) of the communication system, for allocating/selecting at least one SAI for a femto cell upon the femto cell being created. The instructions executable by the computing system and stored on the computer-readable medium perform the method steps of the present invention as set forth in the claims.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method for allocating at least one service area identifier (SAI) for a femto cell that is served by a femto radio base station (RBS) upon said femto cell being created, said femto RBS being connected to a wireless communications network, the method comprising:
   receiving information about detected cells obtained by scanning performed by the femto RBS, and information identifying at least one of the femto cell or the femto RBS;
   transmitting a request for at least one SAI for the femto cell, to a femto SAI selection entity, said request being based on the received information;
   receiving at least one SAI and an associated user type selected by the femto SAI selection entity;
   allocating said at least one SAI and the associated user type, for the created femto cell; and
   filtering the information about detected cells based on the information identifying the femto cell, prior to transmitting the request for at least one SAI for the femto cell, said filtering comprising:
   filtering out information identifying other femto cells included in the information about detected cells.

2. The method according to claim 1, further comprises:
   storing said at least one allocated SAI in a cell configuration context for the created femto cell.

3. The method according claim 1, where the receiving at least one SAI further comprises:
   receiving the information identifying at least one of the created femto cell or the femto RBS of the created femto cell.

4. A method for allocating at least one service area identifier (SAI) for a femto cell that is served by a femto radio base station (RBS) upon said femto cell being created, said femto RBS being connected to a wireless communications network, the method comprising:

receiving information about detected cells obtained by scanning performed by the femto RBS, and information identifying at least one of the femto cell or the femto RBS;

transmitting a request for at least one SAI for the femto cell, to a femto SAI selection entity, said request being based on the received information;

receiving at least one SAI and an associated user type selected by the femto SAI selection entity; and allocating said at least one SAI and the associated user type, for the created femto cell, where each selected SAI is indicative of location information and charging information, and where said location information is based on the information about the detected cells which comprises, for at least one detected macro cell, at least a cell identity (Cell-ID) of the macro cell, a location area identity related to the macro cell (LAI), and a routing area code (RAC) related to the macro cell.

5. The method according to claim 4 where the location information is indicative of a location area of the wireless communications network comprising at least one macro cell detected by the femto RBS.

6. The method according to claim 4 where the location information is indicative of one of the macro cells of the wireless communications network, detected by the femto RBS.

7. The method according to claim 4 where said charging information comprises charging tariffs, where each tariff is associated with a type of user in the created femto cell.

8. An apparatus for allocating at least one service area identifier (SAI) for a femto cell that is served by a femto radio base station (RBS) upon said cell being created, said femto RBS being connected to a wireless communications network, the apparatus comprising:
receiver means for receiving information about detected cells obtained by scanning performed by the femto RBS, and information identifying at least one of the femto cell or the femto RBS;
transmitting means for transmitting a request for at least one SAI for the femto cell, to a femto SAI selection entity, said request being based on the received information;
receiver means for receiving at least one SAI and an associated user type selected by the femto SAI selection entity;
means for allocating said at least one SAI and the associated user type, for the created femto cell; and
filtering means for filtering the information about detected cells based on the information identifying the femto cell, prior to said transmitting means transmitting the request for at least one SAI for the femto cell, said filtering means is to filter out information identifying other femto cells included in the information about detected cells.

9. The apparatus according to claim 8, further comprising: storing means for storing said at least one allocated SAI in a cell configuration context for the created femto cell.

10. The apparatus according to claim 8, where the receiver means is to receive said at least one selected SAI and at least one of the information identifying the created femto cell or the femto RBS of the created femto cell.

11. An apparatus for allocating at least one service area identifier (SAI) for a femto cell that is served by a femto radio base station (RBS) upon said cell being created, said femto RBS being connected to a wireless communications network, the apparatus comprising:
receiver means for receiving information about detected cells obtained by scanning performed by the femto RBS, and information identifying at least one of the femto cell or the femto RBS;
transmitting means for transmitting a request for at least one SAI for the femto cell, to a femto SAI selection entity, said request being based on the received information;
receiver means for receiving at least one SAI and an associated user type selected by the femto SAI selection entity: and
means for allocating said at least one SAI and the associated user type, for the created femto cell,
where the selected SAI is indicative of location information and charging information, and
where the location information is based on the information about the detected cells which comprises, for at least one detected macro cell, at least a cell identity (Cell-ID) of the macro cell, a location area identity related to the macro cell (LAI), and a routing area code (RAC) related to the macro cell.

12. The apparatus according to claim 11, where the location information is indicative of a location area of the wireless communications network comprising at least one macro cell detected by the femto RBS.

13. The apparatus according to claim 11, where the location information is indicative of one of the macro cells in the wireless communications network, detected by the femto RBS.

14. The apparatus according to claim 11, where said charging information comprises charging tariffs, where each tariff is associated with a type of user in the created femto cell.

15. A selection entity for selecting at least one service area identifier (SAI) for a femto cell that is served by a femto radio base station (RBS) upon said cell being created, said femto RBS being connected to a wireless communications network, the selection entity comprising:
a receiver to receive a request for at least one SAI for the femto cell, said request being based on information identifying at least one of the femto cell or the femto RBS and information about detected cells obtained by scanning performed by the femto RBS;
a selector to select at least one SAI and an associated user type, for the created femto cell;
a transmitter to transmit said at least one selected SAI and the associated user type and the information identifying at least one of the femto cell or the femto RBS,
where each selected SAI is indicative of location information and charging information, and
where the location information is based on the information about the detected cells which comprises, for at least one detected macro cell, at least a cell identity (Cell-ID) of the macro cell, a location area identity related to the macro cell (LAI), and a routing area code (RAC) related to the macro cell.

16. A selection entity for selecting at least one service area identifier (SAI) for a femto cell that is served by a femto radio base station (RBS) upon said cell being created, said femto RBS being connected to a wireless communications network, the selection entity comprising:
a receiver to receive a request for at least one SAI for the femto cell, said request being based on information identifying at least one of the femto cell or the femto RBS and information about detected cells obtained by scanning performed by the femto RBS;
a selector to select at least one SAI and an associated user type, for the created femto cell;
a transmitter to transmit said at least one selected SAI and the associated user type and the information identifying at least one of the femto cell or the femto RBS, where each selected SAI is indicative of location information and charging information, and where the location information is indicative of a location area of the wireless communications network comprising at least one macro cell detected by the femto RBS.

17. A selection entity for selecting at least one service area identifier (SAI) for a femto cell that is served by a femto radio base station (RBS) upon said cell being created, said femto RBS being connected to a wireless communications network, the selection entity comprising:
   a receiver to receive a request for at least one SAI for the femto cell, said request being based on information identifying at least one of the femto cell or the femto RBS and information about detected cells obtained by scanning performed by the femto RBS;
   a selector to select at least one SAI and an associated user type, for the created femto cell;
   a transmitter to transmit said at least one selected SAI and the associated user type and the information identifying at least one of the femto cell or the femto RBS,
   where each selected SAI is indicative of location information and charging information, and
   where the location information is indicative of one of the macro cells in the wireless communications network, detected by the femto RBS.

18. A selection entity for selecting at least one service area identifier (SAI) for a femto cell that is served by a femto RBS upoon said cell being created, said femto RBS being connected to a wireless communications network, the selection entity comprising:
   a receiver to receive a request for at least one SAI for the femto cell, said request being based on information identifying at least one of the femto cell or the femto RBS and information about detected cells obtained by scanning performed by the femto RBS;
   a selector to select at least one SAI and an associated user type, for the created femto cell;
   a transmitter to transmit said at least one selected SAI and the associated user type and the information identifying at least one of the femto cell or the femto RBS, and
   where said charging information comprises charging tariffs, where each tariff is associated with a type of user in the created femto cell.

* * * * *

UNITED STATES PATENT AND TRADEMARK OFFICE
CERTIFICATE OF CORRECTION

PATENT NO.        : 8,204,506 B2
APPLICATION NO.   : 12/530106
DATED             : June 19, 2012
INVENTOR(S)       : Lindqvist et al.

Page 1 of 1

It is certified that error appears in the above-identified patent and that said Letters Patent is hereby corrected as shown below:

On the Title Page, in Field (73), under "Assignee", in Column 1, Line 2, delete "(publ)" and insert -- (publ), Stockholm --, therefor.

On the Title Page, in Field (57), under "ABSTRACT", in Column 2, Line 2, delete "(SAI)" and insert -- (SAIs) --, therefor.

In Column 1, Line 47, delete "Internet" and insert -- internet --, therefor.

In Column 3, Line 5, delete "center)" and insert -- center). --, therefor.

In Column 3, Line 7, delete "taxi)" and insert -- taxi). --, therefor.

In Column 6, Line 9, delete "identifier" and insert -- identifiers --, therefor.

In Column 6, Line 10, delete "(RAC)." and insert -- (RACs). --, therefor.

In Column 7, Line 25, delete "(i.e. LA1=LA2)" and insert -- (i.e. LA1=LA2). --, therefor.

In Column 11, Line 44, in Claim 8, delete "entity:" and insert -- entity; --, therefor.

In Column 14, Lines 5-6, in Claim 18, delete "RBS upoon" and insert -- radio base station (RBS) upon --, therefor.

Signed and Sealed this
Twenty-seventh Day of November, 2012

David J. Kappos
*Director of the United States Patent and Trademark Office*